United States Patent
Kodali et al.

(10) Patent No.: US 10,999,759 B2
(45) Date of Patent: May 4, 2021

(54) BUFFER STATUS REPORT INCLUDING UNCATEGORIZED DATA

(71) Applicant: Apple Inc., Cupertino, CA (US)

(72) Inventors: Sree Ram Kodali, Sunnyvale, CA (US); Xu Ou, San Jose, CA (US); Ashwini Raina, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 15/987,240

(22) Filed: May 23, 2018

(65) Prior Publication Data

US 2018/0270703 A1 Sep. 20, 2018

Related U.S. Application Data

(63) Continuation of application No. 15/177,527, filed on Jun. 9, 2016, now Pat. No. 10,015,694.

(51) Int. Cl.
*H04W 28/02* (2009.01)
*H04W 24/08* (2009.01)
*H04W 28/14* (2009.01)

(52) U.S. Cl.
CPC ....... *H04W 28/0278* (2013.01); *H04W 24/08* (2013.01); *H04W 28/0252* (2013.01); *H04W 28/14* (2013.01)

(58) Field of Classification Search
CPC ............. H04W 28/0278; H04W 24/08; H04W 28/0252; H04W 28/14
See application file for complete search history.

(56) References Cited

U.S. PATENT DOCUMENTS

| | | |
|---|---|---|
| 6,987,961 B1 | 1/2006 | Pothana |
| 9,143,921 B2 | 9/2015 | Hu |
| 2013/0244590 A1 | 9/2013 | Nukala |
| 2014/0126363 A1 | 5/2014 | Zeng et al. |
| 2015/0245349 A1 | 8/2015 | Jha et al. |
| 2015/0305061 A1 | 10/2015 | Feuersaenger et al. |
| 2016/0227574 A1 | 8/2016 | Raina et al. |
| 2017/0006622 A1 | 1/2017 | Baghel |
| 2017/0019893 A1 | 1/2017 | Zhao |

*Primary Examiner* — Walli Z Butt
*Assistant Examiner* — Thad N Defauw
(74) *Attorney, Agent, or Firm* — Kowert, Hood, Munyon, Rankin & Goetzel, P.C.

(57) ABSTRACT

This disclosure relates to techniques for a wireless device to report uncategorized data in a buffer status report. A first portion of buffered uplink data to be reported in a buffer status report may be categorized using a traffic flow template. A second portion of buffered uplink data to be reported in the buffer status report may not be categorized using the traffic flow template. A buffer status report indicating both the categorized and the uncategorized buffered uplink data may be transmitted to a base station providing a serving cell to the wireless device. According to some embodiments, the categorized buffered uplink data may be stored in a baseband processor buffer of the wireless device, while the uncategorized buffered uplink data may be stored in an application processor buffer of the wireless device.

20 Claims, 3 Drawing Sheets

BUFFER STATUS REPORT INCLUDING UNCATEGORIZED DATA

This application is a Continuation of and claims priority to U.S. patent application Ser. No. 15/177,527 filed on Jun. 9, 2016 entitled "Buffer Status Report Including Uncategorized Data", which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to systems, methods, and apparatuses for indicating uncategorized data in a buffer status report.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

SUMMARY

Embodiments are presented herein of, inter alia, systems, methods, and apparatuses for a wireless device to indicate uncategorized buffered uplink data in a buffer status report, e.g., in addition to categorized buffered uplink data.

It may be possible for a wireless device to include a relatively small baseband uplink data buffer. For example, for a smaller form factor device, it may be determined to be preferable to include minimal memory space in the modem of the device, while keeping larger buffer(s) available at the application processor and providing a relatively fast interface/communication mechanism between the application processor and baseband to allow relatively quick transfer of uplink data from the application processor to the baseband processor. In such instances, it may be the case that a buffer status report may be capable of reporting a larger amount of data than the baseband uplink data buffer has capacity to store, in which case it may be desirable to also report uplink data buffered at the application processor in the buffer status report, e.g., in order to facilitate efficient uplink communication.

However, at least according to some radio access technologies, it may be the case that the buffer status report format expects that buffered uplink data reported in the buffer status report be categorized using a traffic flow template, e.g., according to a logical channel associated with a data bearer requested for the buffered uplink data, which may be difficult for uplink data buffered at the application processor. Accordingly, this disclosure presents techniques for including uplink data for which a traffic flow template has not yet been applied in a buffer status report.

As one such possibility, uplink data for which a traffic flow template has not yet been applied may be indicated in a buffer status report using a logical channel identifier associated with a default bearer, even though the data has not been positively categorized as such. A similar possibility may include indicating uplink data for which a traffic flow template has not yet been applied using a logical channel identifier associated with a dedicated bearer, even though the data has not been positively categorized as such. As still another possibility, uplink data for which a traffic flow template has not yet been applied may be indicated both using a logical channel identifier associated with a default bearer and using a logical channel identifier associated with a dedicated bearer. As yet another possibility, a logical channel identifier associated with uplink data for which a traffic flow template has not yet been applied may be defined (e.g., added to specification documents for the applicable wireless communication technology, and/or agreed upon by one or more network operator(s) and device vendor(s)), and uplink data for which a traffic flow template has not yet been applied may be indicated using that logical channel identifier.

Note that the techniques described herein may be implemented in and/or used with a number of different types of devices, including but not limited to, base stations, access points, cellular phones, portable media players, tablet computers, wearable devices, and various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
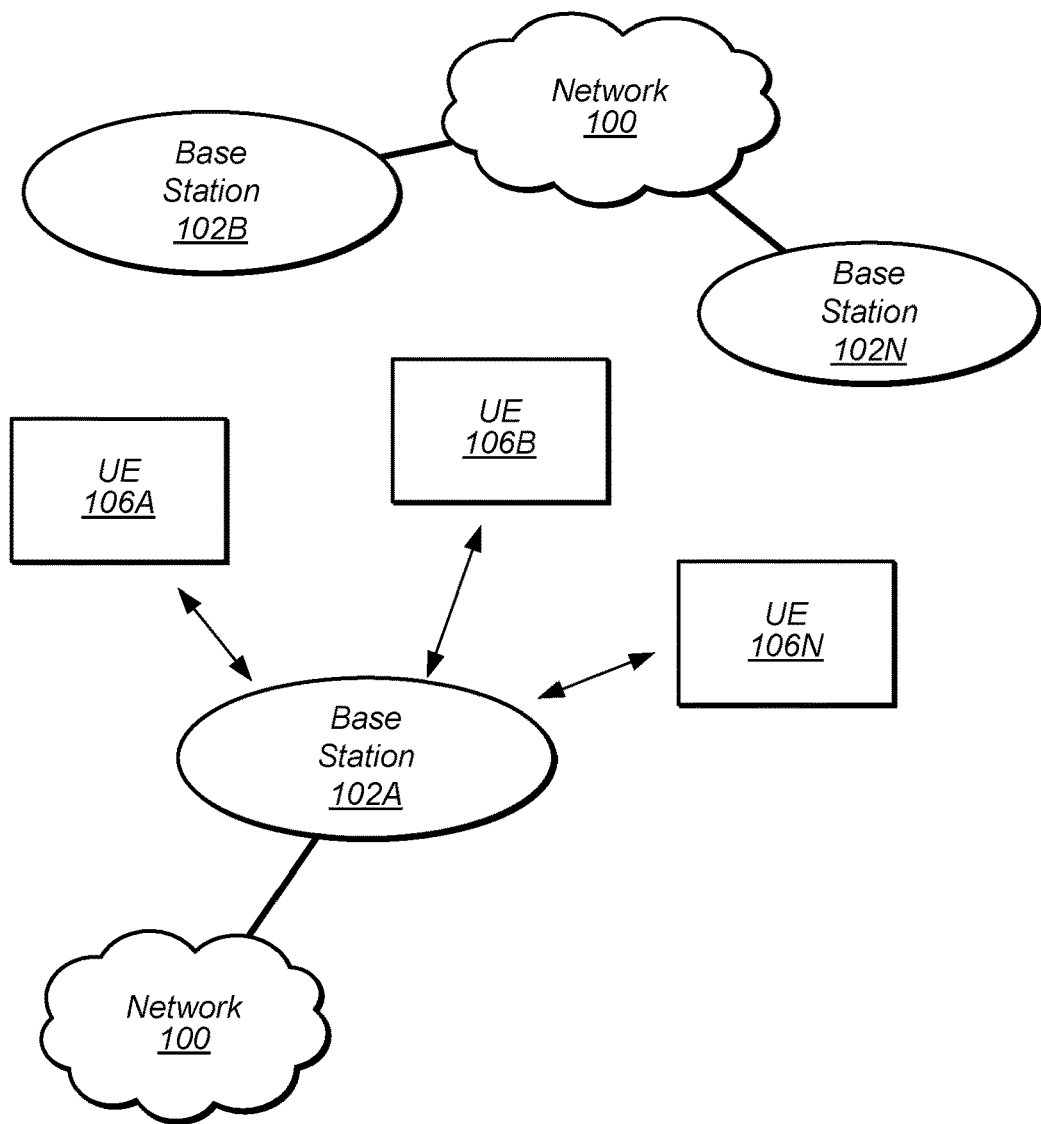
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
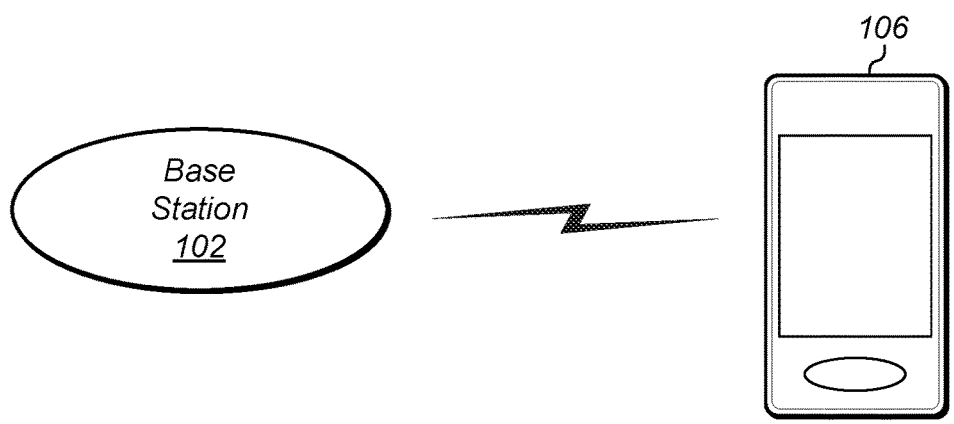
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells that provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor (e.g., potentially including a baseband buffer/memory), analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or UMTS or GSM), and separate radios for communicating using each of Wi-Fi and Bluetooth. Other configurations are also possible.

Figure 3:
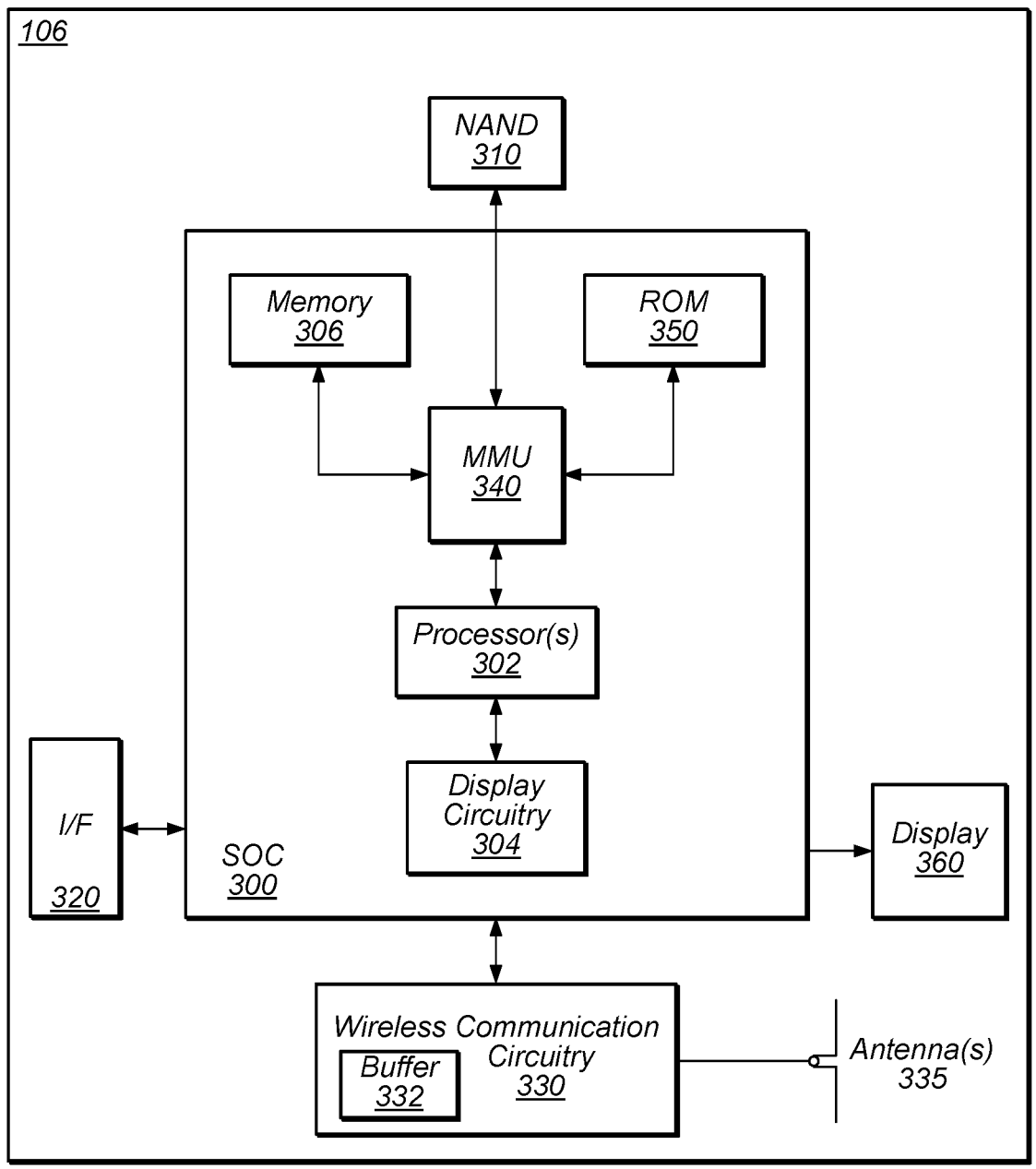
FIG. 3 illustrates an exemplary block diagram of a UE device, according to some embodiments.

FIG. 3—Exemplary Block Diagram of a UE Device

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., baseband processor, radio(s), etc.) 330 (e.g., for LTE, Wi-Fi, GPS, etc.). At least according to some embodiments, the wireless communication circuitry 330 may include a baseband processor with at least one baseband memory element (buffer) 332.

The UE device 106 may include at least one antenna, (and possibly multiple antennas, e.g., for MIMO and/or for implementing different wireless communication technologies, among various possibilities) performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for reporting uncategorized data in a buffer status report, such as those described herein with reference to, inter alia, FIG. 5. A baseband processor comprised in wireless communication circuitry 330 of the UE device 106 may be configured to implement part or all of the methods described herein, e.g., by executing program instructions stored on a memory medium (e.g., a non-transitory computer-readable memory medium). In other embodiments, the baseband processor comprised in wireless communication circuitry 330 may be configured as a programmable hardware element, such as an FPGA (Field Programmable Gate Array), or as an ASIC (Application Specific Integrated Circuit). Alternatively (or in addition) the baseband processor comprised in wireless communication circuitry 330 of the UE device 106, in conjunction with one or more of the other components 300, 302, 304, 306, 310, 320, 332, 335, 340, 350, 360 may be configured to implement part or all of the features described herein, such as the features described herein with reference to, inter alia, FIG. 5.

Figure 4:
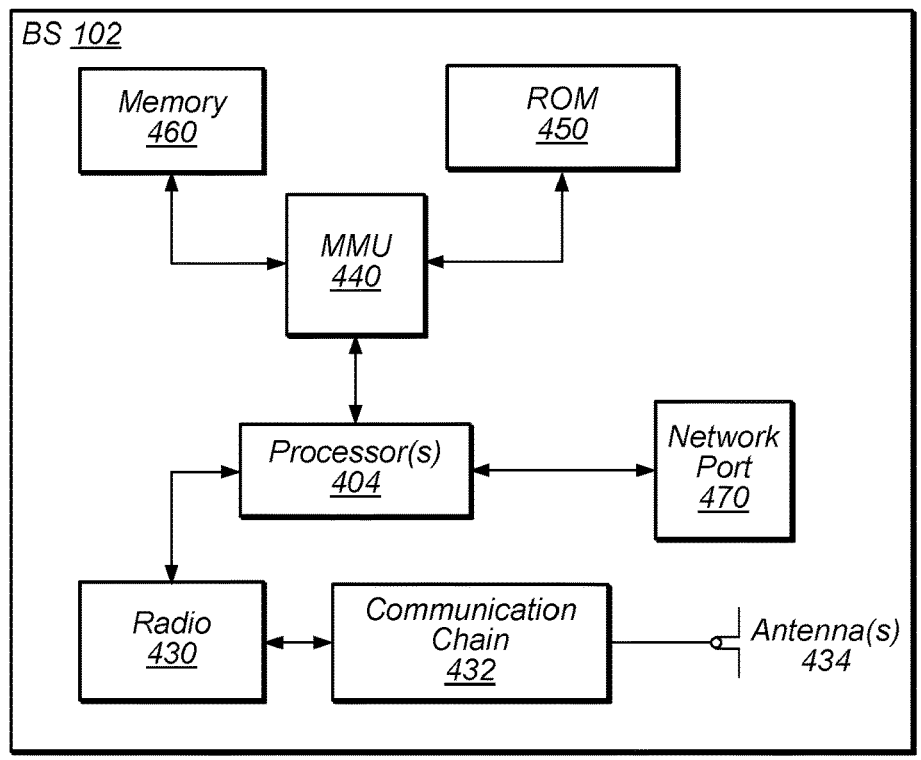
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The BS 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Figure 5:
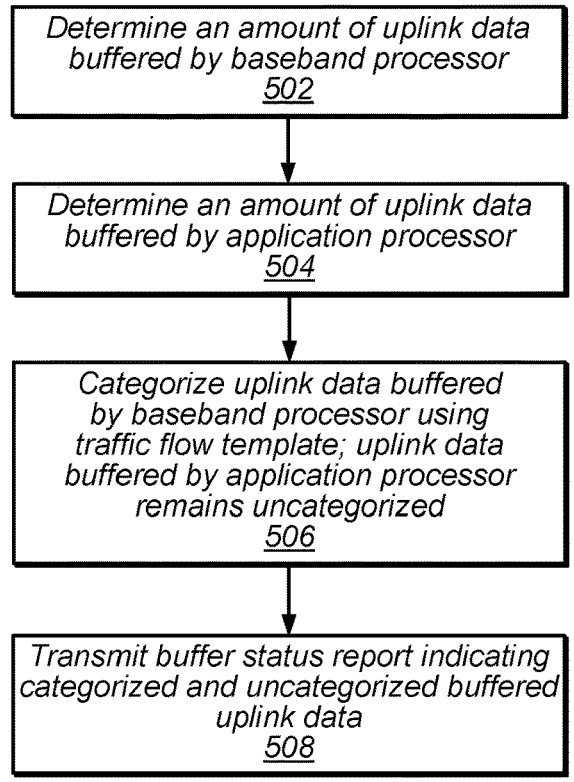
FIG. 5 is a flowchart diagram illustrating an exemplary method for reporting uncategorized data in a buffer status report, according to some embodiments.

FIG. 5—Flowchart Diagram

Many wireless communication systems differentiate between downlink communication and uplink communication. In cellular communication systems, for example, communication from network nodes such as base stations to client (e.g., subscriber/user) wireless devices may be considered downlink communication, while communication from client wireless devices to network nodes may be considered uplink communication. To better account for the typically differing characteristics of base stations and user devices, at least some characteristics of downlink and uplink communication may differ between uplink and downlink communication.

Uplink communication may occur when a wireless device has uplink data to communicate. The uplink data may be generated or otherwise prepared by one or more applications executing on the wireless device. The application(s) may be any of various types of applications that utilize a network connection to communicate over a network. For example, the application(s) (or "app(s)") may include a browser application, email application, voice- and/or video-calling application, messaging application, social media application, media streaming application, game application, intelligent personal assistant application, mapping application, and/or any of a variety of other types of applications.

The uplink data may be provided (e.g., by way of various protocol stack layers) from an application processor (or "AP") to a baseband processor (or "BB") of the wireless device to be transmitted, where the uplink data may be stored in a baseband uplink data buffer while waiting to be transmitted. Depending on a variety of possible considerations (e.g., potentially including but not limited to any or all of wireless medium conditions, battery power level, baseband buffer size, application(s) activity level, user activity level, etc.), it may be the case, at least in some instances, that some uplink data may be buffered at the application processor prior to being provided to the baseband processor.

Many wireless communication systems manage uplink resources at least in part according to the amount of uplink data that various nodes in the system have to be transmitted. For example, in LTE, a wireless device may occasionally provide a buffer status report (BSR) to its serving cell, which indicates a certain amount of uplink data (e.g., internet protocol (IP) data) that the wireless device is currently storing in buffers and that it would like to transmit. The serving cell may subsequently allocate uplink resources to the wireless device to transmit some or all of its buffered uplink data, e.g., based on the BSR.

To assist the network with scheduling appropriate resources for uplink data, it may be expected that the data indicated in a BSR be categorized, for example with respect to a data bearer and/or logical channel associated with the data. For uplink data that is stored in its baseband buffer, a wireless device may use a traffic flow template (TFT) to determine how to categorize each data packet. Based on such information, the resources (e.g., resource blocks or RBs) provided in an uplink grant provided in response to such a BSR may be selected in accordance with the categorization of the data in the BSR.

In some instances, however, a wireless device may have uplink data buffered that is more difficult to categorize that would nonetheless be desirable to indicate in a BSR and be granted uplink resources to transmit. For example, in some instances, the baseband uplink data buffer of a wireless device may have a relatively low capacity (e.g., for memory optimization purposes or for any other desired reason), such that in addition to a full baseband uplink data buffer, the wireless device may have uplink data buffered in an application processor buffer. Even though it might be possible to indicate such uplink data in a BSR, receive an uplink grant in response to the BSR, and pull uplink data from the application processor buffer to the baseband buffer sufficiently quickly (e.g., within 2-3 ms, according to some embodiments; other values are also possible) to be transmitted using the uplink grant, it may be difficult to implement TFT functionalities (e.g., as defined by 3GPP, in the case of LTE, or as otherwise defined by standard specification documents) at the application processor, and thus to categorize the uplink data buffered at the application processor according to its appropriate data bearer and/or logical channel.

Accordingly, it would be useful to provide techniques for reporting uncategorized data in a buffer status report, e.g., in addition to categorized data. FIG. 5 is a flowchart diagram illustrating such a scheme. The scheme shown in FIG. 5 may be used in conjunction with any of the computer systems or devices shown in the above Figures, among other devices. According to some embodiments, the method may be implemented by a wireless device (e.g., a UE 106 such as illustrated in and described with respect to FIGS. 1-3). In various embodiments, some of the elements of the scheme shown may be performed concurrently, in a different order than shown, substituted for by other elements, or may be omitted. Additional elements may also be performed as desired. As shown, the scheme may operate as follows.

In 502, an amount of uplink data buffered by the baseband processor of a wireless device may be determined. The amount of uplink data buffered by the BB may depend on the size of the baseband buffer and the current level of data activity. According to some embodiments, the baseband buffer may have a relatively small capacity, e.g., smaller than the maximum amount of data that can be indicated in a buffer status report. For example, the baseband buffer may have a size such as 50 KB, 75 KB, 100 KB, 150 KB, 200 KB, etc., while (e.g., according to LTE), a basic BSR may be able to indicate up to 150 KB and an extended BSR may be able to indicate up to 3 MB of data. Note that these values are examples only, and various other desired values are also possible.

In 504, an amount of uplink data buffered by the application processor of the wireless device may be determined. The amount of uplink data buffered by the AP may depend on the size of the AP buffer and the current level of data activity. According to some embodiments, the AP buffer may have a larger capacity, e.g., larger than the capacity of the BB buffer and possibly equal to or larger than the maximum amount of data that can be indicated in a buffer status report. Thus, uplink data may be buffered at the AP as needed until the BB is ready for it, and then may be pulled from the AP buffer to the BB buffer prior to being transmitted.

In 506, the uplink data buffered by the baseband processor may be categorized using a TFT. For example, an uplink traffic flow template may be used to filter buffered packets into appropriate categories, e.g., based on which bearer(s) should be used to transmit those packets. Packet header information for buffered packets may be examined as part of the TFT functionality, e.g., to determine source and destination IP addresses, TCP port numbers, etc., and thus to determine a type of traffic represented by the packet, which may in turn be mapped to a specific bearer (e.g., default or dedicated), which may potentially have a certain expected or guaranteed Quality of Service (QoS) level appropriate to that type of traffic. For example, according to some embodiments, voice packets (e.g., VoIP packets) may be categorized for transmission using a dedicated bearer, while non-voice (e.g, email, browser, messaging, etc.) packets may be categorized for transmission using a default bearer. Other categorization schemes are also possible.

The uplink data buffered by the application processor may remain uncategorized. As previously noted, implementing TFT functionality at the AP may be difficult. For example, according to some embodiments, the uplink data buffered at the AP may not yet have been processed by transport and/or network layers, and may not yet be ready for TFT processing. Furthermore, even if the uplink data buffered at the AP were ready for TFT processing, due to the logical arrangement in which the AP handles application and higher layer activity while the BB handles lower layer baseband activity, the AP may not be aware of a variety of technology and/or network-specific details needed to accurately categorize data packets to appropriate bearers, and introducing such functionality to the AP may represent an additional complexity with an undesirable cost (e.g., in terms of power consumption, software bloat, etc.).

In 508, a BSR indicating both categorized and uncategorized buffered uplink data may be transmitted. For example, the BSR may indicate both uplink data buffered at BB, which has been categorized, and uplink data buffered at AP, which has not been categorized.

The amount of data indicated by the BSR may depend on a (e.g., predetermined) maximum amount of data that can be indicated by the BSR, e.g., due to BSR format specifications. For example, according to LTE, a ("short") BSR may be a one octet MAC control element with a defined format capable of indicating that a wireless device has up to 150 KB of uplink data buffered for one specific logical channel group. An extended ("long") BSR may be a three octet MAC control element with a defined format capable of indicating that a wireless device has up to 3 MB of uplink data buffered for multiple logical channel groups. Note that the BSR transmitted by the wireless device may be either a short BSR or a long BSR, or may have another BSR format altogether (e.g., a BSR format according to a different RAT).

The amount of data indicated by the BSR may also depend on the amounts of uplink data buffered at BB and AP respectively. According to some embodiments, if the total combined amount of uplink data buffered at both BB and AP is less than the maximum amount of data that can be indicated by the BSR, the total combined amount of uplink data buffered at both BB and AP may be indicated by the BSR. If, however, the total combined amount of uplink data buffered at both BB and AP is greater than the maximum amount of data that can be indicated by the BSR, all of the uplink data buffered at BB may be indicated by the BSR, as well as an amount of uplink data buffered at AP up to the remaining capacity of the BSR.

According to some embodiments, the format of the BSR may not include the capability to indicate uncategorized data. For example, it may be the case that any data indicated by the BSR is associated with a logical channel group/identifier, all of which may be associated with possible data bearers. In such a scenario, the BSR may indicate that the uncategorized buffered uplink data (e.g., IP packets for which a TFT has not yet been applied, but that are nonetheless waiting to be transmitted) is to be transmitted using a default bearer (e.g., the default evolved packet service (EPS) bearer for the current access point name (APM), in LTE), e.g., using a logical channel identifier associated with the default bearer, or alternatively, may indicate that the uncategorized buffered uplink data is to be transmitted using a dedicated bearer (e.g., the dedicated EPS bearer for the current APN, in LTE), if a dedicated bearer has been configured, e.g., using a logical channel identifier associated with the dedicated bearer, even though a positive categorization of that buffered uplink data has not occurred. As another possibility, if the BSR has sufficient capacity, the BSR may indicate that the uncategorized buffered uplink data is to be transmitted using a default bearer, and also may indicate that the uncategorized buffered uplink data is to be transmitted using a dedicated bearer (e.g., effectively signaling that there is twice as much uncategorized data as there actually is). However, at least in some instances, this could result in receiving a larger uplink grant than necessary, in which case the wireless device may transmit padding using the granted excess uplink resources, which may represent an inefficient network resource usage.

As another possibility, the format of the BSR may include the capability to indicate uncategorized data. For example, a logical channel group/identifier may be defined as being associated with uncategorized data (e.g., data that is not yet mapped to a bearer type using a TFT), and may not be mapped to any specific uplink transmission resources. In such a scenario, the BSR may indicate that the uncategorized buffered uplink data is uncategorized, e.g., by associating the uncategorized buffered uplink data with a logical channel identifier defined as indicating that data has not been categorized using a traffic flow template.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a wireless user device, the method comprising:
by a wireless device:
determining an amount of buffered uplink data to be reported in a a medium access control (MAC) control element (CE), wherein the buffered uplink data comprises a first portion and a second portion, wherein the first portion of the buffered uplink data comprises categorized data, wherein the first portion of the buffered uplink data is mapped to one or more logical channels, wherein the second portion of the buffered uplink data comprises uncategorized data, wherein the second portion of the buffered uplink data is not yet mapped to any logical channels; and
transmitting the MAC CE to a base station providing a serving cell to the wireless device.

2. The method of claim 1, wherein the first portion of the buffered uplink data is categorized using a traffic flow template.

3. The method of claim 1, wherein the MAC CE indicates that the second portion of the buffered uplink data is to be transmitted using a default bearer.

4. The method of claim 1, wherein the MAC CE indicates that the second portion of the buffered uplink data is to be transmitted using a dedicated bearer.

5. The method of claim 1, wherein the MAC CE indicates that the second portion of the buffered uplink data is not categorized by associating the second portion of the buffered uplink data with a logical channel identifier that is not mapped to any specific uplink transmission resources.

6. The method of claim 1, wherein the MAC CE indicates that the second portion of the buffered uplink data is to be transmitted using a default bearer and also indicates that the second portion of the buffered uplink data is to be transmitted using a dedicated bearer.

7. An apparatus, comprising a processing element configured to cause a wireless device to:
determine a first amount of buffered data, wherein the first amount of buffered data is categorized data, wherein the categorized data is mapped to at least one logical channel;
determine a second amount of buffered data, wherein the second amount of buffered data is not yet categorized data;
determine an amount of data to be indicated by a a medium access control (MAC) control element (CE), wherein the amount of data to be indicated by the MAC CE is based on both the first amount of buffered data and the second amount of buffered data; and
transmit the MAC CE to a base station providing a serving cell to the wireless device.

8. The apparatus of claim 7, wherein the MAC CE indicates that the second amount of buffered data is to be transmitted on a default bearer.

9. The apparatus of claim 7, wherein the MAC CE indicates that the second amount of buffered data is to be transmitted on a dedicated bearer.

10. The apparatus of claim 7, wherein the first amount of buffered data is categorized according to a bearer on which the data is to be transmitted, wherein said categorization is performed using a traffic flow template.

11. The apparatus of claim 7, wherein the first amount of buffered data is buffered at a baseband processor of the wireless device.

12. The apparatus of claim 7, wherein the MAC CE indicates that the second amount of buffered data is uncategorized.

13. The apparatus of claim 7, wherein the MAC CE comprises an extended buffer status report.

14. The apparatus of claim 10, wherein said categorization comprises examination of header information of the first amount of buffered data.

15. The apparatus of claim 12, wherein indicating that the second amount of buffered data is uncategorized comprises using a logical channel identifier defined as indicating buffered data that is not categorized using a traffic flow template.

16. A wireless device, comprising:
an antenna;
a radio operably coupled to the antenna;
a processing element operably coupled to the radio, wherein the processing element is configured to cause the wireless device to:
determine a first amount of uplink data that is categorized;
determine a second amount of uplink data that is not yet categorized; and
transmit a a medium access control (MAC) control element (CE)to a base station providing a serving cell to the wireless device, wherein the MAC CE is based on both the first amount of uplink data that is categorized and the second amount of uplink data that is not categorized.

17. The wireless device of claim 16, wherein the first amount of uplink data is categorized using a traffic flow template.

18. The wireless device of claim 16, wherein the MAC CE indicates that the second amount of uplink data is uncategorized.

19. The wireless device of claim 16, wherein the MAC CE indicates that the second amount of uplink data is to be transmitted on a default bearer.

20. The wireless device of claim 17, wherein the second amount of uplink data is buffered at an application processor of the wireless device.

* * * * *